US009236896B2

(12) United States Patent
Yeh et al.

(10) Patent No.: US 9,236,896 B2
(45) Date of Patent: Jan. 12, 2016

(54) SYSTEMS AND METHODS FOR COEXISTENCE OF A PLURALITY OF WIRELESS COMMUNICATIONS MODULES

(75) Inventors: Chih-Hao Yeh, Hsinchu (TW); Hong-Kai Hsu, Yonghe (TW); En-Chieh Hsia, Kaohsiung (TW); Hsien-Chyi Chiou, Hsinchu (TW); Wei Wang, Taichung (TW); Shu-Ping Shiu, Tainan County (TW)

(73) Assignee: MEDIATEK INC., Hsin-Chu (TW)

( * ) Notice: Subject to any disclaimer, the term of this patent is extended or adjusted under 35 U.S.C. 154(b) by 692 days.

(21) Appl. No.: 12/940,337

(22) Filed: Nov. 5, 2010

(65) Prior Publication Data

US 2011/0053523 A1    Mar. 3, 2011

Related U.S. Application Data

(63) Continuation-in-part of application No. 12/696,154, filed on Jan. 29, 2010.

(60) Provisional application No. 61/348,319, filed on May 26, 2010, provisional application No. 61/224,107, filed on Jul. 9, 2009.

(51) Int. Cl.
*H04B 1/403* (2015.01)
*H04B 17/309* (2015.01)
(Continued)

(52) U.S. Cl.
CPC .............. *H04B 1/406* (2013.01); *H04B 17/309* (2015.01); *H04B 17/318* (2015.01); *H04B 17/336* (2015.01); *H04B 17/345* (2015.01);
(Continued)

(58) Field of Classification Search
CPC ................................ H04W 88/06; H04B 1/406
USPC .......................... 370/297, 310, 328, 329, 339
See application file for complete search history.

(56) References Cited

U.S. PATENT DOCUMENTS 6,185,434 B1 * 2/2001 Hagstrom et al. ......... 455/552.1
6,826,162 B2 * 11/2004 Haines et al. ................. 370/332
(Continued)

FOREIGN PATENT DOCUMENTS

CN    101154951    4/2008
CN    101232674    7/2008
(Continued)

OTHER PUBLICATIONS

German language office action dated Mar. 7, 2011.
(Continued)

*Primary Examiner* — Hassan Kizou
*Assistant Examiner* — Ashil Farahmand
(74) *Attorney, Agent, or Firm* — McClure, Qualey & Rodack, LLP (57) ABSTRACT

A wireless communications system is provided with a first wireless communications module, a second wireless communications module, and an RF module. The first wireless communications module transmits or receives a first wireless signal, and the second wireless communications module transmits or receives a second wireless signal. The RF module allocates a first transceiving path and a second transceiving path to the first wireless communications module and the second wireless communications module, respectively, to enable the transmission or reception of the first wireless signal and the second wireless signal at the same time.

21 Claims, 10 Drawing Sheets

(51) Int. Cl.
*H04W 16/14* (2009.01)
*H04W 52/36* (2009.01)
*H04W 88/04* (2009.01)
*H04W 88/06* (2009.01)
*H04B 17/318* (2015.01)
*H04B 17/336* (2015.01)
*H04B 17/345* (2015.01)

(52) U.S. Cl.
CPC .............. *H04W 16/14* (2013.01); *H04W 52/36* (2013.01); *H04W 88/04* (2013.01); *H04W 88/06* (2013.01)

(56) References Cited

U.S. PATENT DOCUMENTS

| | | |
|---|---|---|
| 6,970,681 B2 | 11/2005 | Darabi et al. |
| 7,446,626 B2 | 11/2008 | Gorbachov |
| 7,496,060 B2* | 2/2009 | Ramirez et al. ............... 370/311 |
| 7,561,852 B2 | 7/2009 | Darabi et al. |
| 7,924,943 B2 | 4/2011 | Kim et al. |
| 8,077,755 B2 | 12/2011 | Wu et al. |
| 8,155,612 B1 | 4/2012 | Husted et al. |
| 8,391,916 B2 | 3/2013 | Tomizu |
| 8,442,016 B1* | 5/2013 | Lee et al. ...................... 370/338 |
| 2002/0053947 A1 | 5/2002 | Macedo |
| 2003/0198280 A1 | 10/2003 | Wang et al. |
| 2004/0192222 A1* | 9/2004 | Vaisanen et al. ............... 455/78 |
| 2005/0163070 A1 | 7/2005 | Farnham et al. |
| 2006/0030265 A1 | 2/2006 | Desai et al. |
| 2006/0194600 A1 | 8/2006 | Palin et al. |
| 2007/0021066 A1 | 1/2007 | Dravida et al. |
| 2007/0099567 A1 | 5/2007 | Chen et al. |
| 2007/0117558 A1 | 5/2007 | Balwani |
| 2007/0224936 A1* | 9/2007 | Desai .......................... 455/41.2 |
| 2008/0123610 A1 | 5/2008 | Desai et al. |
| 2008/0130603 A1 | 6/2008 | Wentink et al. |
| 2008/0137566 A1 | 6/2008 | Marholev et al. |
| 2008/0139118 A1 | 6/2008 | Sanguinetti |
| 2008/0192806 A1 | 8/2008 | Wyper et al. |
| 2008/0253345 A1 | 10/2008 | Sanguinetti |
| 2008/0279138 A1 | 11/2008 | Gonikberg et al. |
| 2009/0040937 A1 | 2/2009 | Xhafa et al. |
| 2009/0111500 A1 | 4/2009 | Sudak et al. |
| 2009/0170447 A1 | 7/2009 | Marlett et al. |
| 2009/0176454 A1 | 7/2009 | Chen et al. |
| 2009/0239471 A1 | 9/2009 | Tran et al. |
| 2009/0258607 A1 | 10/2009 | Beninghau et al. |
| 2010/0008252 A1* | 1/2010 | Alve .............................. 370/252 |
| 2010/0210299 A1 | 8/2010 | Gorbachov |
| 2010/0260082 A1* | 10/2010 | Lum et al. ..................... 370/297 |
| 2010/0262987 A1 | 10/2010 | Imanilov |
| 2011/0009060 A1 | 1/2011 | Hsu et al. |

FOREIGN PATENT DOCUMENTS

| | | |
|---|---|---|
| CN | 101252757 A | 8/2008 |
| CN | 101253735 | 8/2008 |
| CN | 201222725 | 4/2009 |
| DE | 112005003515 T5 | 3/2008 |
| EP | 1 928 197 | 6/2008 |
| JP | 2008235978 | 10/2008 |
| JP | 2009-65307 | 3/2009 |
| TW | 2006 29938 | 8/2006 |
| TW | 200703939 | 1/2007 |
| WO | WO 2007/120945 | 10/2007 |
| WO | WO 2008/124796 | 10/2008 |

OTHER PUBLICATIONS

English language translation of office action.
English language translation of abstract of CN 101252757A (published Aug. 27, 2008).
English language translation of abstract of CN 101154951 (published Apr. 2, 2008).
English language translation of abstract of CN 101232674 (published Jul. 30, 2008).
English language translation of abstract of DE112005003515T5 (published Mar. 13, 2008).
English language translation of abstract of JP 2008235978 (published Oct. 2, 2008).
English language translation of abstract of CN 101253735 (published Aug. 27, 2008).
English language translation of abstract of TW 2006 29938 (published Aug. 16, 2006).
English language translation of abstract of TW 200703939 (published Jan. 16, 2007, p. 3 of publication).
English language translation of abstract of JP 2009-65307 (published Mar. 26, 2009).
English language translation of abstract of CN 201222725 (published Apr. 15, 2009).

* cited by examiner

FIG. 9

SYSTEMS AND METHODS FOR COEXISTENCE OF A PLURALITY OF WIRELESS COMMUNICATIONS MODULES

CROSS REFERENCE TO RELATED APPLICATIONS

This application is a Continuation-In-Part of U.S. application Ser. No. 12/696,154, filed on Jan. 29, 2010, which claims the benefit of U.S. Provisional Application No. 61/224,107, filed on Jul. 9, 2009, the entirety of which is incorporated by reference herein. This application also claims the benefit of U.S. Provisional Application No. 61/348,319, filed on May 26, 2010, the entirety of which is incorporated by reference herein.

BACKGROUND OF THE INVENTION

1. Field of the Invention

The invention relates generally to the coexistence of a plurality of wireless communications modules, and more particularly, to systems and methods for the coexistence schemes for a plurality of co-located wireless communications modules in a wireless communications device.

2. Description of the Related Art

Figure 1:
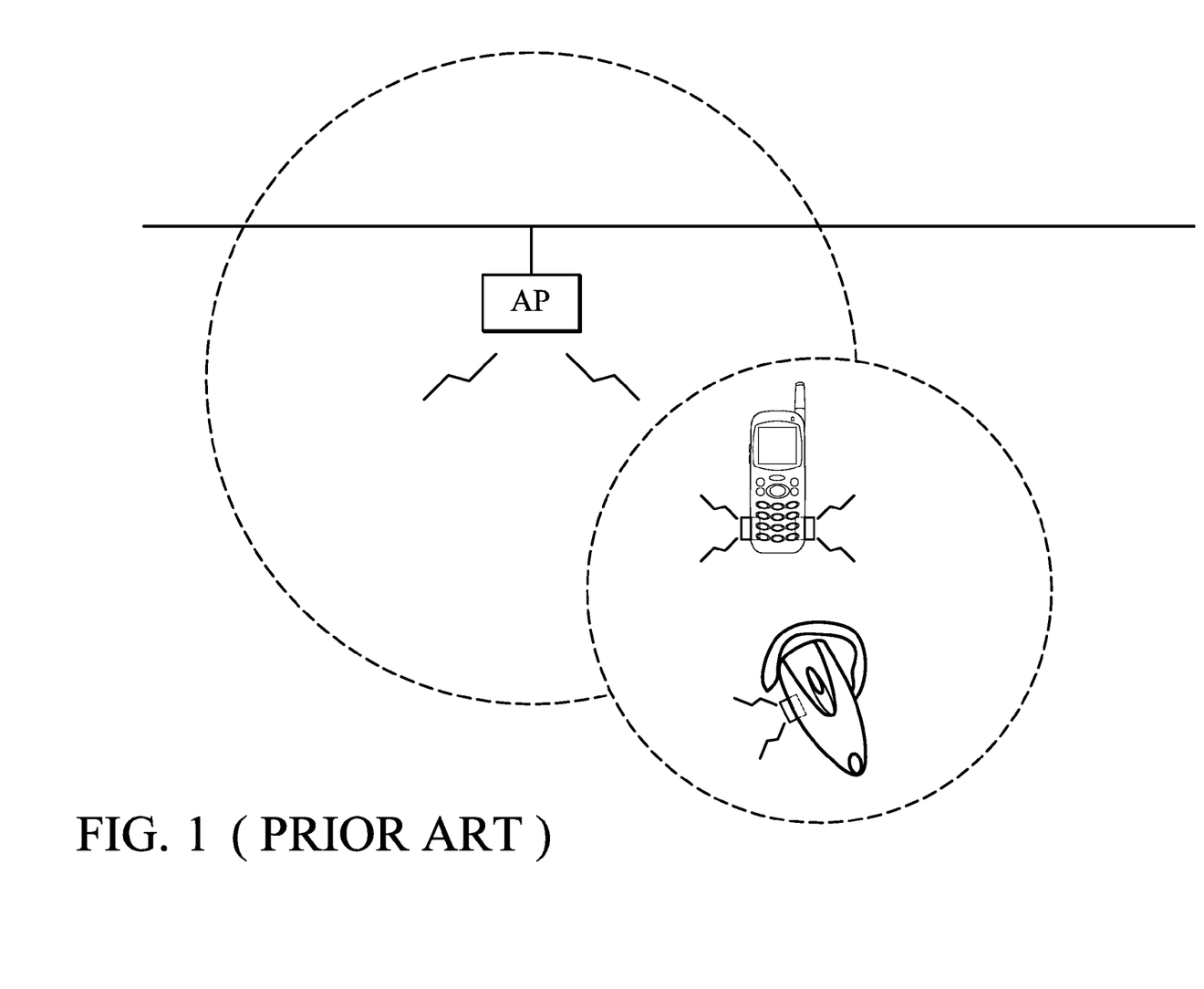
FIG. 1 shows a cellular phone connecting to a Wireless Local Area Network (WLAN) via a WLAN module thereof as well as communicating with a Bluetooth handset through a Bluetooth module thereof.

To an increasing extent, a multitude of communication functions are being merged into mobile devices. As shown in FIG. 1, a cellular phone may connect to a wireless local area network (WLAN) via a WLAN module thereof and simultaneously communicate with a Bluetooth (BT) handset (or a Bluetooth car audio, or others) through a Bluetooth module thereof. A WLAN system is typically implemented inside buildings as an extension to wired local area networks (LANs) and is able to provide the last few meters of connectivity between a wired network and mobile or fixed devices. According to the IEEE 802.11 standard, most WLAN systems may operate in the 2.4 GHz license-free frequency band and have very low throughput rates because of coexistence interference from BT systems. Referring to FIG. 1, a WLAN is established by an access point (AP) connecting to a LAN by an Ethernet cable. The AP typically receives, buffers, and transmits data between the WLAN and the wired network infrastructure. The AP may support, on average, twenty devices and have a coverage varying from 20 meters in an area with obstacles (walls, stairways, elevators etc) to 100 meters in an area with clear line of sight. BT is an open wireless protocol for exchanging data over short distances from fixed and mobile devices, creating personal area networks (PANs). The cellular phone may receive voice over internet protocol (VoIP) data via the WiFi module and further transmit the VoIP data through an established PAN to the BT handset, and vice versa. Alternatively, the cellular phone may transmit digital music through the established PAN to be played back in the BT handset. The WLAN and BT systems both occupy a section of the 2.4 GHz Industrial, Scientific, and Medical (ISM) band, which is 83 MHz-wide. Due to cost issues as well as space requirements for components, modern electronic devices, such as cellular phones, Ultra-Mobile PCs (UMPCs) or others, are equipped with WLAN and BT modules sharing a single antenna instead of multiple antennas.

Figure 2:
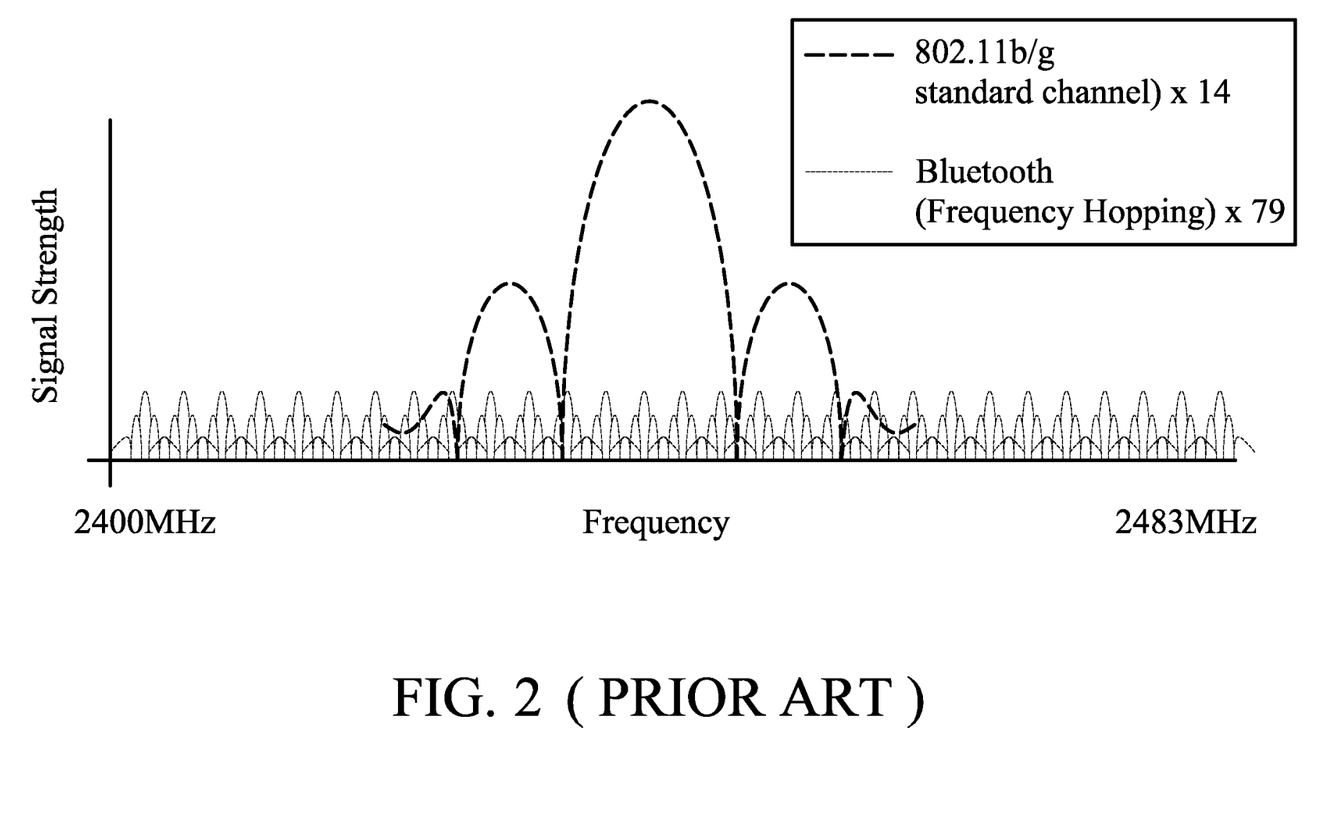
FIG. 2 shows a diagram of Bluetooth frequency Hopping.

As an example shows in FIG. 2, a BT system uses a Frequency Hopping Spread Spectrum (FHSS) and hops between 79 different 1 MHz-wide channels in a Bluetooth spectrum. A WLAN system carrier remains centered on one channel, which is overlapped with Bluetooth spectrum. When the WLAN module and the Bluetooth module are operating simultaneously in the same area, as shown in FIG. 1, and a BT transmission occurs on a frequency band that falls within the frequency space occupied by an ongoing WLAN transmission, a certain level of interference may occur, depending on the signal strength thereof. Due to the fact that the WLAN module and BT module share the same spectrum and also share a single antenna, preventing interference therebetween is required.

Figure 3:
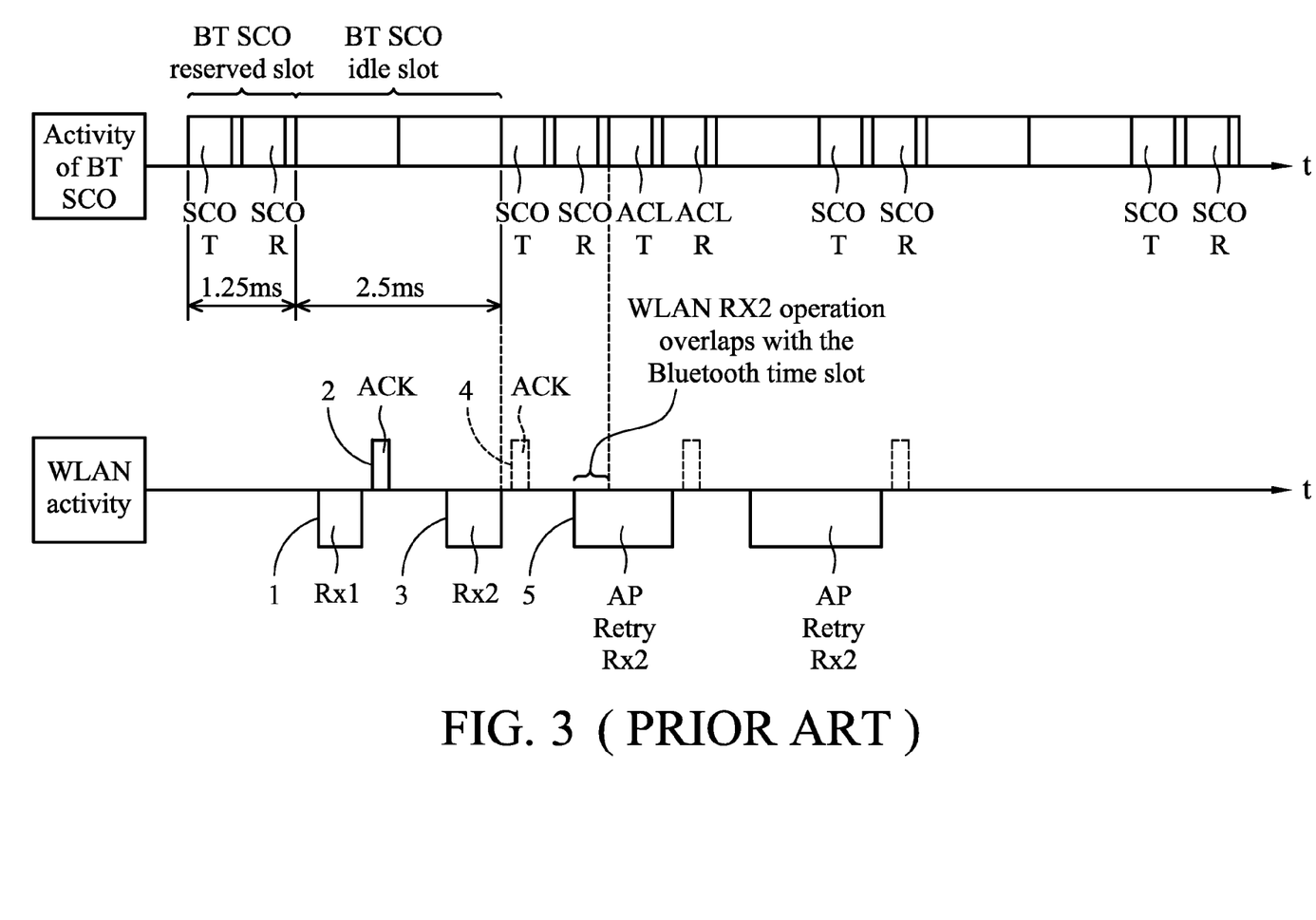
FIG. 3 is a schematic diagram illustrating operation conflicts occurring between WLAN and BT communication services sharing a single antenna.

FIG. 3 is a schematic diagram illustrating operation conflicts occurring between WLAN and BT communication services sharing a single antenna. In FIG. 3, the shared single antenna is switched between WLAN and BT communication services in a given time slot for transceiving data. If the BT communication service carries audio data that requires real-time transmission, for example, Synchronous Connection-Oriented (SCO) packets, the BT communication service would have a higher priority over the WLAN communication service. In this case, when a WLAN transceiving process takes place at the same time as the real-time BT transceiving process, a time slot will be assigned to the BT transceiving process and the WLAN transceiving process will be blocked. As shown in FIG. 3, the WLAN receiving operation (Rx operation) 1 occurs in the time slot, while the BT communication service is idle. Therefore, the Rx operation 1 is performed without interference and an acknowledgement (ACK) message 2 is sent to the WLAN AP (such as the AP in FIG. 1) as a reply message indicating that the Rx operation 1 has been completed. Following the Rx operation 1, another WLAN Rx operation 3 is performed. The Rx operation 3 is also performed without interference because the BT communication service is in the idle state. However, an ACK message 4 in response to the Rx operation 3 can not be replied to the WLAN AP, as its time slot has already been assigned to the Bluetooth transmitting operation (Tx operation). Accordingly, the Rx operation 3 would be determined to have failed. In response to the failure, the WLAN AP would re-transmit the data frame with a lower data rate in an attempt to successfully transmit data to the WLAN module of the mobile device. Unfavorably, the re-performed Rx operation 3 (denoted as 5), with a prolonged operation period, would be more likely to overlap with the BT transceiving process. Thus, data frame would once again be re-transmitted with an even lower data rate than that for the prior re-transmitted data, which would cause even more overlap with the BT transceiving process than the prior attempt. As a result, because the WLAN and BT wireless communication services sharing a single antenna are time-division accessed (i.e., only one communication service of WLAN and BT can be enabled at each time slot), throughput of the WLAN is greatly hindered.

BRIEF SUMMARY OF THE INVENTION

In light of the previously described problems, there exists a need for a method and system, in which coexistence of a plurality of wireless communication modules sharing a single antenna is provided for simultaneous operations thereof.

One aspect of the invention discloses a wireless communications system, comprising a first wireless communications module, a second wireless communications module, and an RF module. The first wireless communications module is configured to transmit or receive a first wireless signal and the second wireless communications module is configured to transmit or receive a second wireless signal. The RF module is configured to allocate a first transceiving path and a second transceiving path to the first wireless communications module and the second wireless communications module, respectively, to enable the transmission or reception of the first wireless signal and the second wireless signal at the same time.

Another aspect of the invention discloses a method for coexistence of a plurality of wireless communications modules in a wireless communications device. The method comprises the steps of: determining whether a first wireless communications module is transmitting or receiving a first wireless signal, and a second wireless communications module is transmitting or receiving a second wireless signal; and allocating a first transceiving path and a second transceiving path to the first wireless communications module and the second wireless communications module, respectively, to enable the transmission or reception of the first wireless signal and the second wireless signal at the same time.

Other aspects and features of the invention will become apparent to those with ordinary skill in the art upon review of the following descriptions of specific embodiments of the wireless communications system, and the method for the coexistence of a plurality of wireless communications modules in a wireless communications device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
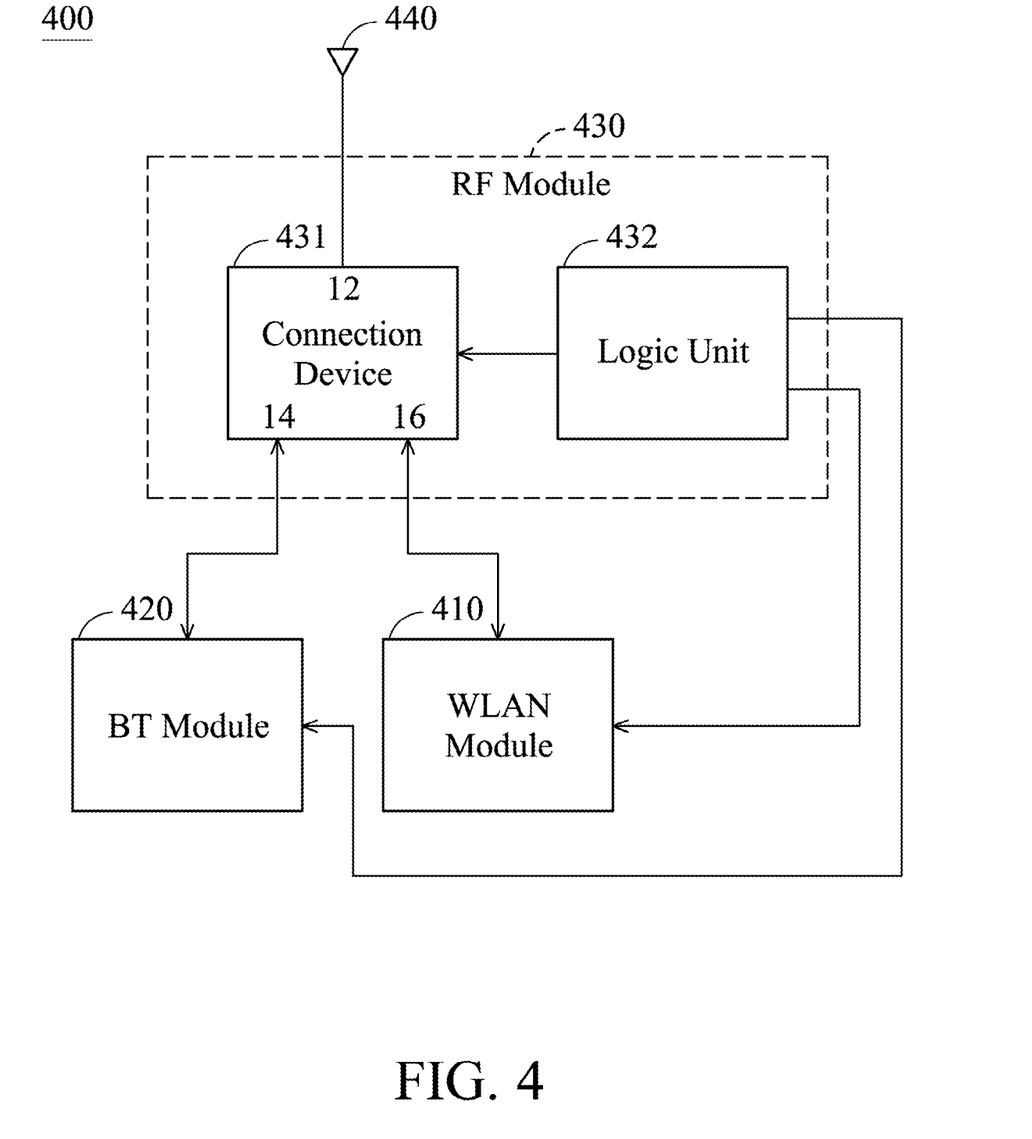
FIG. 4 is a block diagram illustrating a wireless communications system according to an embodiment of the invention.

FIG. 4 is a block diagram illustrating a wireless communications system according to an embodiment of the invention. The system 400 comprises a WLAN module 410, a BT module 420, an RF module 430, and an antenna 440. The WLAN module 410 provides the functionality of WLAN communications (such as WiFi communications) via the antenna 440, while the BT module 420 provides the functionality of BT communications via the antenna 440. Specifically, the WLAN module 410 may be configured to transmit or receive WLAN signals, and the BT module 420 may be configured to transmit or receive BT signals. Both of the WLAN module 410 and the BT module 420 may contain a processing unit, such as a general-purpose processor or a micro-control unit (MCU), to load and execute a series of program codes of the respective wireless communication protocol from a storage unit to provide functionalities for respective wireless communications. The antenna 440 is configured to operate at 2.4 GHz license-free frequency band. The RF module 430 comprises a connection device 431 and a logic unit 432. The connection device 431 comprises a plurality of transceiving paths for connecting the WLAN module 410 and the BT module 420 to the antenna 440. The logic unit 432 controls the allocations of the transceiving paths in the connection device 431 to the WLAN module 410 and the BT module 420. Specifically, the logic unit 432 allocates a first transceiving path and a second transceiving path in the connection device 431 to the WLAN module 410 and the BT module 420, respectively, to enable the transmission or reception of the WLAN signals and the BT signals at the same time. The RF module 430 may further comprise multiple function units or hardware components for processing the receiving or transmitting wireless signals. It is to be understood that the antenna 440 may be disposed outside of the wireless communications system 400 or the WLAN module 410 and the BT module 420 may be integrated into a wireless communications chipset, and the invention is not limited thereto.

Figure 5A:
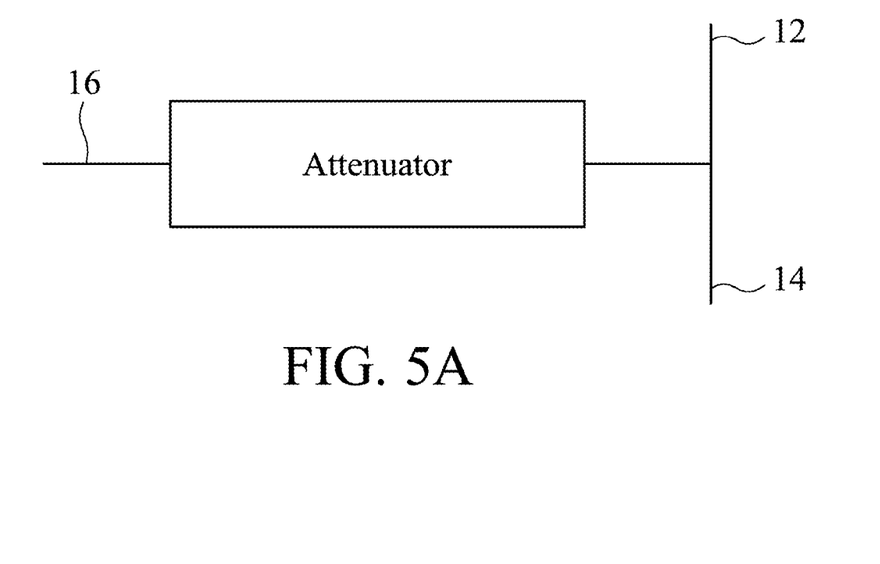
FIG. 5A shows a connection device implemented using an attenuator in accordance with an embodiment of the invention.
Figure 5B:
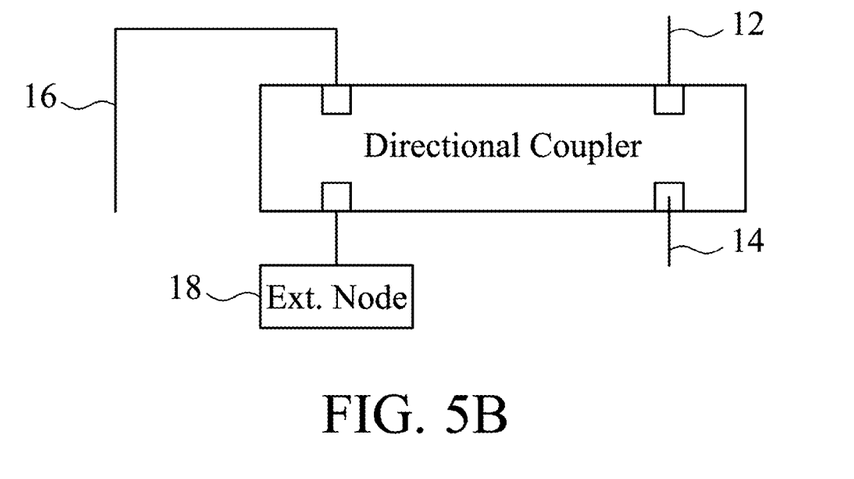
FIG. 5B shows a connection device implemented using a directional coupler in accordance with an embodiment of the invention.

The connection device 431 may comprise three ports 12, 14 and 16, and may be configured to couple the ports 12 and 14 to form a transceiving path (through path), and to couple the ports 12 and 16 to form another transceiving path (coupled path), wherein the port 14 is isolated from the port 16 by substantially 20 dB and the electrical signals passing through the path between ports 12 and 16 are substantially attenuated by 6 or 10 dB. Referring to FIG. 5A, the connection device 431 may contain an attenuator attenuating electrical signals passing through the ports 12 and 16 by 20 dB. Alternatively, the connection device 431 may contain a directional coupler, as shown in FIG. 5B, in which the ports 12 and 14 are coupled as a through path, the port 16 and an external node 18 are connected as a through path, the ports 12 and 16 are coupled as a coupled path, and the ports 14 and 16 are isolated with a loss around 20-40 dB. The through path is direct or indirect through and the external node 18 may be a resistor (for example, a 50Ω resistor or a 50Ω equivalent termination). Note that the through path between the ports 12 and 14 may have a path loss of 0.5 dB, substantially while the coupled path between ports 12 and 16 may have a path loss of 10 dB substantially, or the through path between ports 12 and 14 may have a path loss of 1.2 dB substantially, while the coupled path between ports 12 and 16 may have a path loss of 6 dB substantially.

Figure 6A:
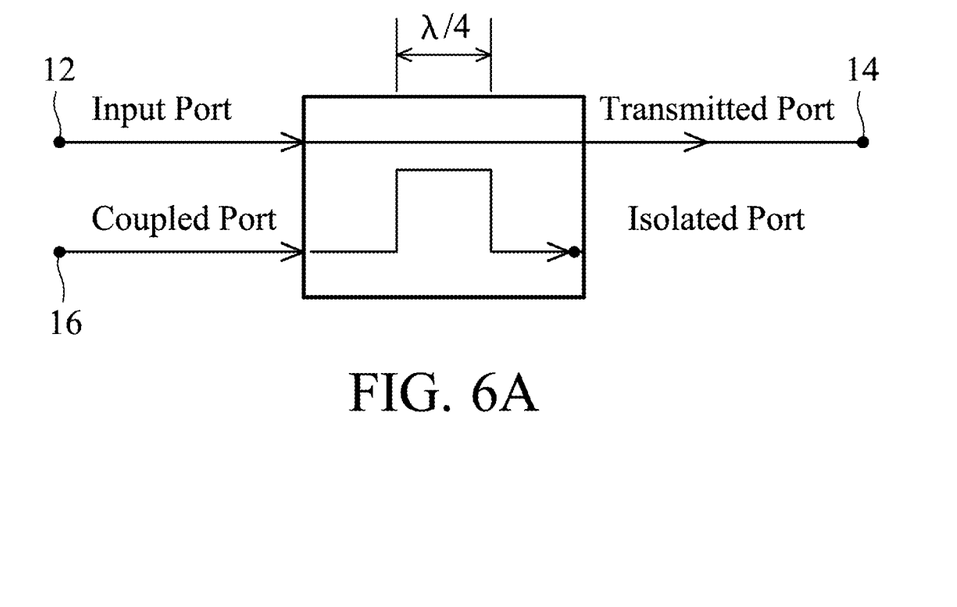
FIGS. 6A and 6B illustrate two embodiments of the directional coupler shown in FIG. 5B.
Figure 6B:
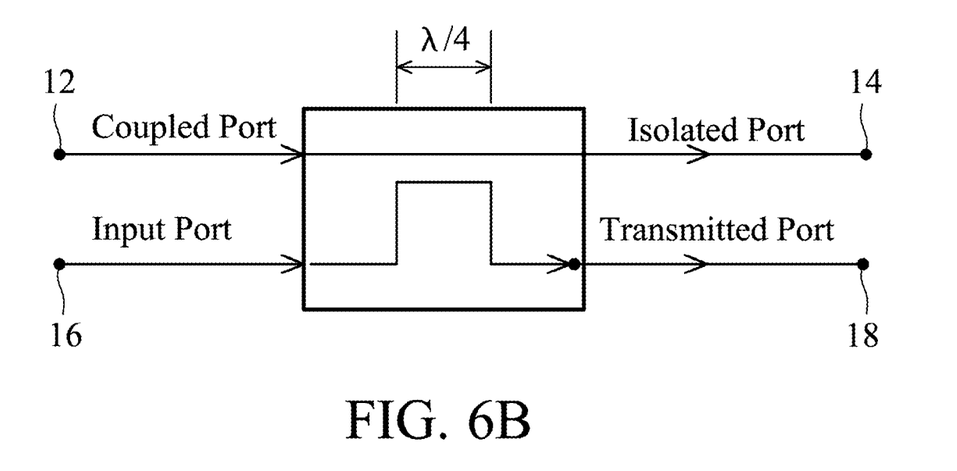

FIG. 6A and FIG. 6B illustrate two embodiments of the directional coupler shown in FIG. 5B. Referring to FIG. 6A, two transmission lines are set sufficiently close together, such that electrical signals (or energy) directed from the port 12 (connected to a port called an input port) to the port 14 (connected to a port called a transmitted port) is coupled to the port 16 (connected to a port called a coupled port). Similarly, referring to FIG. 6B, electrical signals (or energy) directed from the ports 16 (connected to a port called an input port) to a transmitted port (such as port 18 in FIG. 5B) is coupled to the port 12 (connected to a port called a coupled port) and isolated from the port 14 (connected to a port called an isolated port), such that the coupled signals can be added to electrical signals passing between the ports 12 and 14.

In addition to the attenuator (FIG. 5A) and the directional coupler (FIG. 5B), the connection device 431 may be implemented in a power divider, in which the ports 14 and 16 are isolated and both ideally have a path loss of 3 dB (3.5 dB in practice). Furthermore, the connection device 431 may be implemented in a power splitter. The structure of the power splitter is similar to that of the power divider, but with different path losses between the output ports. For a power splitter, the path loss at the ports 14 and 16 are different. For example, the port 16 may have a path loss of 10 dB while the port 14 may have a path loss of 0.5 dB, or the port 16 may have a path loss of 6 dB while the port 14 may have a path loss of 1 dB. For the coupling values of the power splitter, reference may be made to the Table 1 below:

TABLE 1

| Coupling Value For Through Path | Power Ratio (%) |
|---|---|
| 3 dB | 50/50 |
| 6 dB | 75/25 |
| 8 dB | 85/15 |
| 10 dB | 90/10 |
| 15 dB | 97/3 |
| 20 dB | 99/1 |

Taking the coupling value of 3 dB (3 dB directional coupler) for example, the through path has a path loss of 3 dB substantially, and the coupled path also has a path loss of 3 dB substantially. For the 6 dB directional coupler, the through path has a path loss of 1 dB substantially, and the coupled path also has a path loss of 6 dB substantially. For the 10 dB directional coupler, the through path has a path loss of 0.5 dB substantially, whereas the coupled path also has a path loss of 10 dB substantially. Moreover, the connection device 431 may be implemented by a PCB pad with an input port and two output ports, in which one of the output ports has a path loss of NdB and another output port has a path loss of smaller than 1 dB, as designed based on requirements. Note that the power splitter may be implemented using a directional coupler, such as the one shown in FIG. 5B, with the port 18 connected to a resistor for impedance matching, and ports 14 and 16 are isolated. With the power splitter implemented using a directional coupler as shown in FIG. 5B, the port 16 may have a path loss of 10 dB while the port 14 may have a path loss of 0.5 dB, or the port 16 may have a path loss of 6 dB while the port 14 may have a path loss of 1 dB.

The transceiving paths in the connection device 431 have different path losses, and the allocation of the transceiving paths to the WLAN module 410 and the BT module 420 may be determined by the logic unit 432 according to the operation statuses of the WLAN module 410 and/or the BT module 420. Table 2 below depicts exemplary allocations of the transceiving paths in the connection device 431 according to an embodiment of the invention:

TABLE 2

| Operation Status of the BT module 420 | Operation Status of the WLAN module 410 | |
|---|---|---|
| | OFF | ON |
| OFF | NULL | Allocate the through path to WLAN module |
| ON | Allocate the through path to BT module | Check on the signal indicators of the WLAN and BT signals |

In Table 2 above, "ON" indicates that the WLAN module 410 or the BT module 420 is activated (i.e. the WLAN function or the BT function is turned on), and "OFF" indicates that the WLAN module 410 or the BT module 420 is de-activated (i.e. the WLAN function or the BT function is turned off) "NULL" means that the allocations of the transceiving paths are not necessary since both of the WLAN module 410 and the BT module 420 are not performing wireless signal transmission or reception. Note that the through path, which has lower path loss, is allocated to the WLAN module 410 or the BT module 420 if only one of the WLAN module 410 or the BT module 420 is performing the wireless signal transmission or reception. Note that, if both the WLAN module 410 and the BT module 420 are activated, the logic unit 432 may need to check on the signal indicators of the WLAN and BT signals. Further description regarding the allocations of the transceiving paths will be explained below in more detail with references to the flowchart in FIG. 7.

Figure 7:
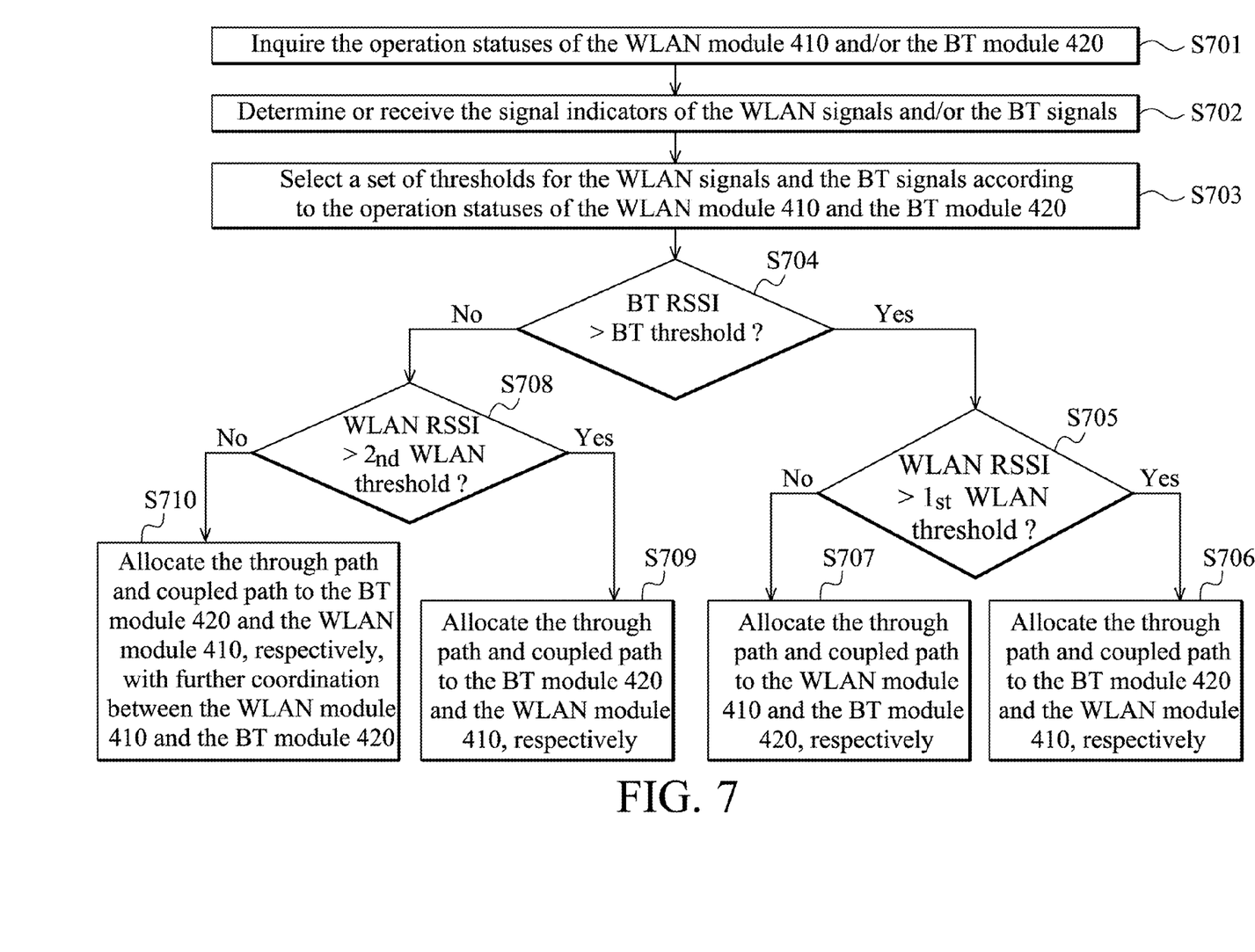
FIG. 7 is a flowchart illustrating the method for the coexistence of the WLAN module 410 and the BT module 420 according to an embodiment of the invention.
Figure 8A:
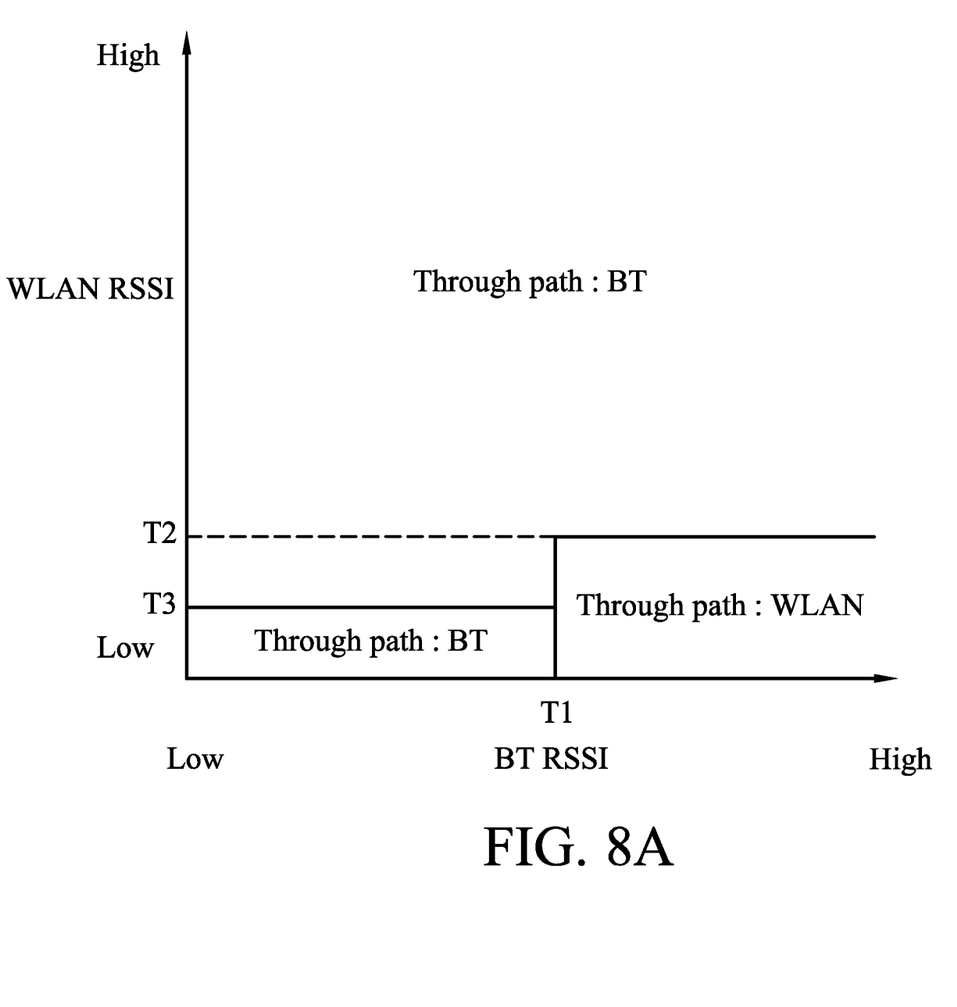
FIGS. 8A and 8B are schematic diagrams illustrating the sets of thresholds for real-time BT applications and non real-time BT applications according to an embodiment of the invention.
Figure 8B:
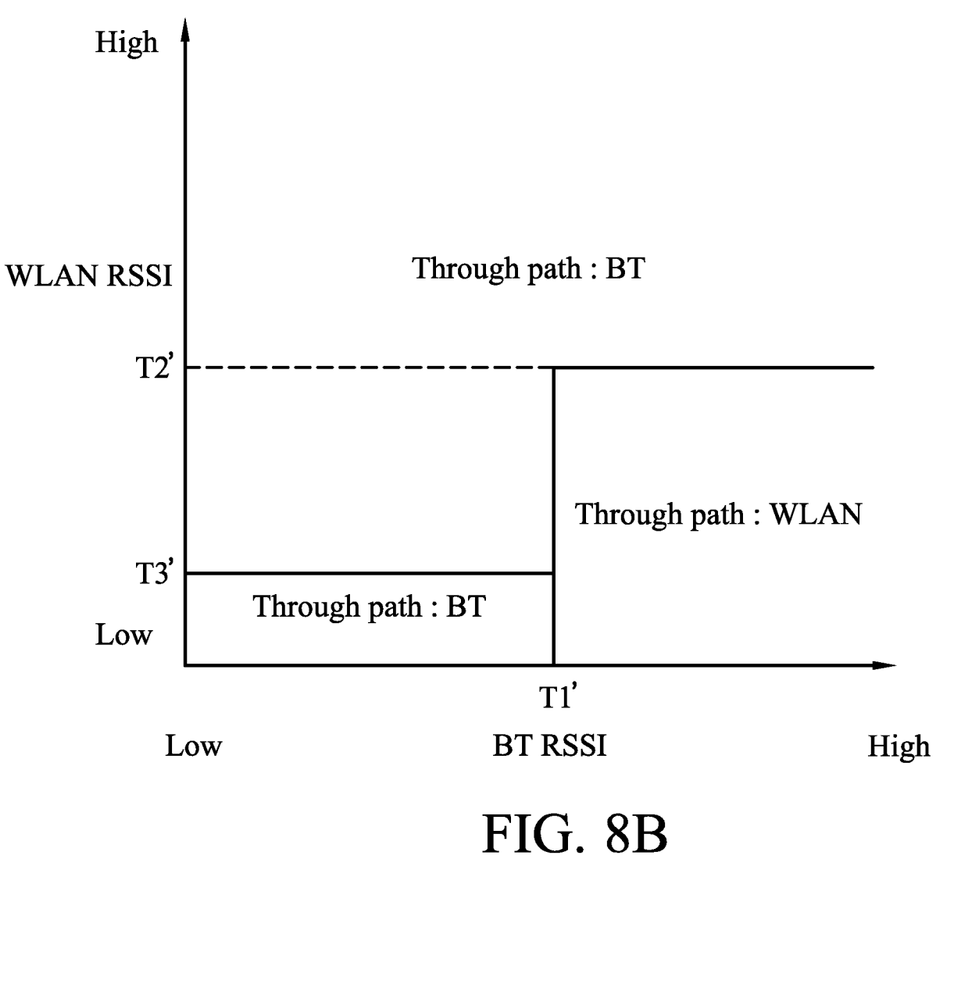
Figure 9:
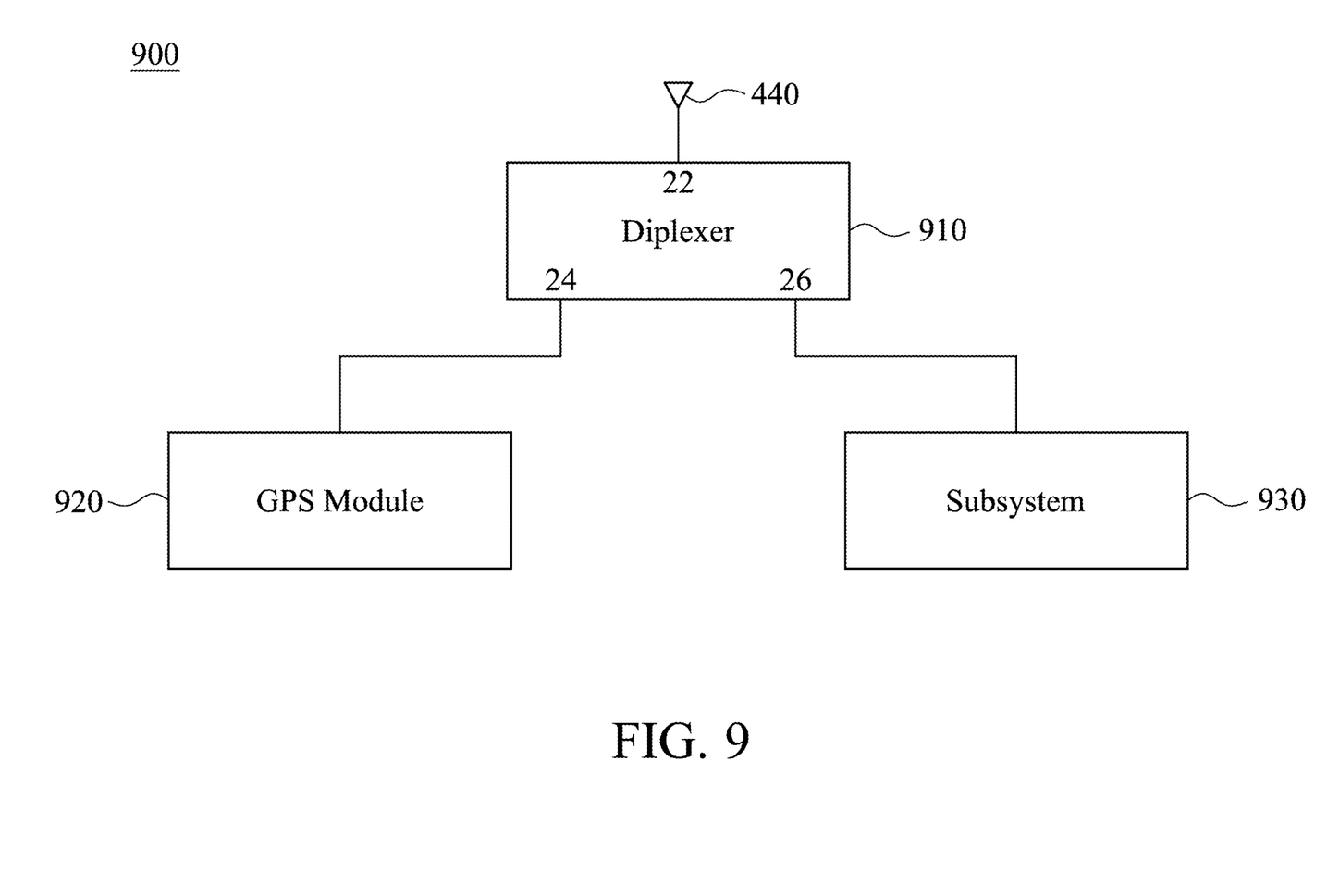
FIG. 9 shows a system for coexistence between a Global Positioning System (GPS) and a subsystem sharing a single antenna according to an embodiment of the invention.

FIG. 7 is a flowchart illustrating the method for the coexistence of the WLAN module 410 and the BT module 420 according to an embodiment of the invention. The method begins by inquiring about the operation statuses of the WLAN module 410 and/or the BT module 420, to determine whether WLAN function is turned on/off, and/or whether the BT function is turned on/off (step S701). In addition to information concerning whether the WLAN function or the BT function is turned on, the operation statuses can also include information concerning whether WLAN/Bluetooth carries data for real-time applications or non real-time applications. Next, the logic unit 432 further determines the signal indicators of the WLAN signals and/or the BT signals, or receives the signal indicators of the WLAN signals and/or the BT signals from other module such as an additional processor not shown in FIG. 4 (step S702). The signal indicators may be received signal strength indications (RSSI), signal to noise ratios (SNR), interference to signal ratios (ISR), adjacent channel interferences (ACI), packet error rates (PER), or bit error rates (BER) of the WLAN signals and/or the BT signals. Alternatively, the signal indicators may contain more than one of the RSSI, SNR, ISR, ACI, PER, and BER of the WLAN signals and/or the BT signals. In this embodiment, the RSSI is taken as the signal indicator for the WLAN and BT signals. The logic unit 432 further selects a set of thresholds for determining whether the WLAN signals and the BT signals are in good condition according to the operation statuses of the WLAN module 410 and the BT module 420 (step S703), wherein the thresholds are adjustable. Specifically, a set of thresholds may be selected for the BT signals of real-time applications, while another set of thresholds may be selected for the BT signals of non real-time applications. The real-time application, for example, includes SCO and A2DP applications. FIGS. 8A and 8B are schematic diagrams illustrating the sets of thresholds for real-time BT applications and non real-time BT applications according to an embodiment of the invention. As shown in FIGS. 8A and 8B, each set of thresholds includes one BT threshold and two WLAN thresholds used as signal quality criteria, wherein T1 and T1' represent the BT thresholds and T2, T2', and T3, T3' represent the first and second WLAN thresholds. Note that the BT signals for real-time applications are taken as an example for FIG. 8A and the BT signals for non real-time applications are taken as an example for FIG. 8B, and both of FIGS. 8A and 8B show the thresholds with respect to the RSSI, being taken as the signal indicator for the WLAN and BT signals. However, other signal quality indicators, such as the SNR, ISR, ACI, PER, and BER of the WLAN and BT signals, may be used as well for the selection of the set of thresholds with different requirements of the respective signal quality indicators.

Subsequently, the logic unit 432 may determine the signal quality of the BT signals by checking if the RSSI of the BT signals is greater than the BT threshold in the selected set of thresholds (step S704). That is, if the selected set of thresholds is the set of thresholds as shown in FIG. 8A, then the logic unit 432 may compare the RSSI of the BT signals to T1, and if the selected set of thresholds is the set of thresholds as shown in FIG. 8B, then the logic unit 432 may compare the RSSI of the BT signals to T1'. Subsequent to step S704, if so, the logic unit 432 may determine the signal quality of the WLAN signals by checking if the RSSI of the WLAN signals is greater than the first WLAN threshold in the selected set of thresholds (step S705). That is, if the selected set of thresholds is the set of thresholds as shown in FIG. 8A, then the logic unit 432 may compare the RSSI of the WLAN signals to T2; and if the selected set of thresholds is the set of thresholds as shown in FIG. 8B, then the logic unit 432 may compare the RSSI of the WLAN signals to T2'. If the RSSI of the WLAN signals is greater than the first WLAN threshold in the selected set of thresholds, the logic unit 432 may allocate the through path and coupled path to the BT module 420 and the WLAN module 410, respectively (step S706). Otherwise, the logic unit 432 may allocate the through path and coupled path to the WLAN module 410 and the BT module 420, respectively (step S707). Subsequent to step S704, if not, the logic unit 432 may determine the signal quality of the WLAN signals by checking if the RSSI of the WLAN signals is greater than the second WLAN threshold in the selected set of thresholds (step S708). That is, if the selected set of thresholds is the set of thresholds as shown in FIG. 8A, then the logic unit 432 may compare the RSSI of the WLAN signals to T3, and if the selected set of thresholds is the set of thresholds as shown in FIG. 8B, then the logic unit 432 may compare the RSSI of the WLAN signals to T3'. If the RSSI of the WLAN signals is greater than the second WLAN threshold in the selected set of thresholds, the logic unit 432 may allocate the through path and coupled path to the BT module 420 and the WLAN module 410, respectively (step S709). Otherwise, the logic unit 432 may also allocate the through path and coupled path to the BT module 420 and the WLAN module 410, respectively, by further coordination between the WLAN module 410 and the BT module 420 (step S710).

In step S710, the further coordination between the WLAN module 410 and the BT module 420 may be required due to the fact that both of the WLAN signals and the BT signals have bad signal quality (i.e. the RSSIs are below the respective thresholds) and may not withstand the coexistence interference from each other. To further clarify, the logic unit 432 may collect the potential Tx/Rx operations of the WLAN module 410 and the BT module 420 in an upcoming period of time, and then arbitrate which one of the WLAN module 410 and the BT module 420 will be able to obtain the usage of the antenna 440 if a collision occurs in an upcoming period of time. If the WLAN module 410 is granted to obtain usage of the antenna 440, then the Tx/Rx operations of the WLAN module 410 may be performed while the Tx/Rx operations of the BT module 420 are suspended. Otherwise, if the BT module 420 is granted to obtain the usage of the antenna 440, then the Tx/Rx operations of the BT module 420 may be performed while the Tx/Rx operations of the WLAN module 410 are suspended. Accordingly, the coexistence interference may be prevented and the signal qualities of the WLAN and BT signals may be assured. Without departing from the spirit of the invention, other embodiments of the method for the coexistence of a BT module and a WiMAX/LTE module, or the coexistence of a WLAN module and a WiMAX/LTE module, may be contemplated with relevant modifications according to the architectures in FIG. 4 and the control flow in FIG. 7.

Note that the peer BT device, which the wireless communications system 400 is communicating with via the BT module 420, may dynamically change its transmission power, and variations on the signal indicator of the received BT signals in the wireless communications system 400 may occur. This may further cause changes to the allocation of the transceiving paths of the WLAN module 410 and the BT module 420, and even cause system performance degression if the changes occur too often. In order to prevent constant variations on the signal indicator of the received BT signals, the BT module 420 may further request the peer BT device to keep a fixed transmission power for the transmission of the BT signals. In addition, the distance between the peer BT device or the WLAN AP and the wireless communications system 400 may be taken into account for the allocations of the transceiving paths. For example, if the distance between the peer BT device and the wireless communications system 400 is far, the logic unit 432 may allocate the through path to the BT module 420 to minimize loss of the BT signals; and if the distance between the peer BT device and the wireless communications system 400 is near and the distance between the WLAN AP and the wireless communications system 400 is far, the logic unit 432 may allocate the through path to the WLAN module 410 to minimize the loss of WLAN signals. The distance between the peer BT device or the WLAN AP and the wireless communications system 400 may be determined according to the signal indicators of the WLAN signals or the BT signals. For example, a high RSSI of the BT signals may indicate that the peer BT device is near the wireless communications system 400, and a low RSSI of the BT signals may indicate that the peer BT device is far away from the wireless communications system 400.

Subsequently, the logic unit 432 may determine the signal quality of the BT signals by checking if the RSSI of the BT signals is greater than the BT threshold in the selected set of thresholds (step S704). That is, if the selected set of thresholds is the set of thresholds as shown in FIG. 8A, then the logic unit 432 may compare the RSSI of the BT signals to T1, and if the selected set of thresholds is the set of thresholds as shown in FIG. 8B, then the logic unit 432 may compare the RSSI of the BT signals to T1'. Subsequent to step S704, if so, the logic unit 432 may determine the signal quality of the WLAN signals by checking if the RSSI of the WLAN signals is greater than the first WLAN threshold in the selected set of thresholds (step S705). That is, if the selected set of thresholds is the set of thresholds as shown in FIG. 8A, then the logic unit 432 may compare the RSSI of the WLAN signals to T2; and if the selected set of thresholds is the set of thresholds as shown in FIG. 8B, then the logic unit 432 may compare the RSSI of the WLAN signals to T2'. If the RSSI of the WLAN signals is greater than the first WLAN threshold in the selected set of thresholds, the logic unit 432 may allocate the through path and coupled path to the BT module 420 and the WLAN module 410, respectively (step S706). Otherwise, the logic unit 432 may allocate the through path and coupled path to the WLAN module 410 and the BT module 420, respectively (step S707). Subsequent to step S704, if not, the logic unit 432 may determine the signal quality of the WLAN signals by checking if the RSSI of the WLAN signals is greater than the second WLAN threshold in the selected set of thresholds (step S708). That is, if the selected set of thresholds is the set of thresholds as shown in FIG. 8A, then the logic unit 432 may compare the RSSI of the WLAN signals to T3, and if the selected set of thresholds is the set of thresholds as shown in FIG. 8B, then the logic unit 432 may compare the RSSI of the WLAN signals to T3'. If the RSSI of the WLAN signals is greater than the second WLAN threshold in the selected set of thresholds, the logic unit 432 may allocate the through path and coupled path to the BT module 420 and the WLAN module 410, respectively (step S709). Otherwise, the logic unit 432 may also allocate the through path and coupled path to the BT module 420 and the WLAN module 410, respectively, with further coordination between the WLAN module 410 and the BT module 420 (step S710).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communications system, comprising:
   a first wireless communications transceiver configured to transmit or receive a first wireless signal;
   a second wireless communications transceiver configured to transmit or receive a second wireless signal; and
   an RF module comprising a connection device which comprises at least one antenna-side port and at least two module-side ports, wherein a first transceiving path is formed by a coupling of the antenna-side port and one of the transceiver-side ports and a second transceiving path is formed by a coupling of the antenna-side port and another one of the transceiver-side ports; and
   wherein the RF module is configured to allocate the first transceiving path and the second transceiving path to the first wireless communications transceiver and the second wireless communications transceiver, respectively, to enable the transmission or reception of the first wireless signal and the second wireless signal at the same time,
   wherein the first transceiving path and the second transceiving path are allocated according to a distance between the wireless communications system and a peer wireless communications device, and
   wherein the first wireless communications transceiver or the second wireless communications transceiver further requests the peer wireless communications device to transmit the first wireless signal or the second wireless signal with a fixed transmission power.

2. The wireless communications system as claimed in claim 1, wherein the first transceiving path and the second transceiving path are allocated according to operation statuses of the first wireless communications transceiver or the second wireless communications transceiver.

3. The wireless communications system as claimed in claim 1, wherein the connection device is a directional coupler.

4. The wireless communications system as claimed in claim 1, wherein the distance is determined according to a signal indicator of the first wireless signal or the second wireless signal.

5. The wireless communications system as claimed in claim 1, wherein the first transceiving path and the second transceiving path are allocated according to signal indicators of the first wireless signal or the second wireless signal.

6. The wireless communications system as claimed in claim 5, wherein the signal indicators comprise at least one of the following:
   received signal strength indication (RSSI) of the first wireless signal or the second wireless signal;
   signal to noise ratio (SNR) of the first wireless signal or the second wireless signal;
   interference to signal ratio (ISR) of the first wireless signal or the second wireless signal;
   adjacent channel interference (ACI) of the first wireless signal or the second wireless signal;
   packet error rate (PER) of the first wireless signal or the second wireless signal; and
   bit error rate (BER) of the first wireless signal or the second wireless signal.

7. The wireless communications system as claimed in claim 5, wherein the first transceiving path has a smaller path loss than the second transceiving path when the signal indicator of the first wireless signal is lower than a threshold.

8. The wireless communications system as claimed in claim 5, wherein the first transceiving path has a smaller path loss than the second transceiving path when the signal indicator of the second wireless signal is greater than a threshold.

9. The wireless communications system as claimed in claim 5, wherein the first transceiving path has a smaller path loss than the second transceiving path, when the signal indicator of the first wireless signal is greater than a first threshold and the signal indicator of the second wireless signal is greater than a second threshold.

10. The wireless communications system as claimed in claim 5, wherein the first transceiving path has a greater path loss than the second transceiving path when the signal indicator of the first wireless signal is greater than a first threshold and the signal indicator of the second wireless signal is lower than or equal to a second threshold.

11. A method for coexistence of a plurality of wireless communications transceivers in a wireless communications device, comprising:
   providing a connection device comprising a connection device which comprises at least one antenna-side port and at least two transceiver-side ports, wherein a first transceiving path is formed by a coupling of the antenna-side port and one of the transceiver-side ports and a second transceiving path is formed by a coupling of the antenna-side port and another one of the transceiver-side ports;
   determining whether a first wireless communications transceiver is transmitting or receiving a first wireless signal, and a second wireless communications transceiver is transmitting or receiving a second wireless signal; and
   allocating the first transceiving path and the second transceiving path to the first wireless communications transceiver and the second wireless communications transceiver, respectively, to enable the transmission or reception of the first wireless signal and the second wireless signal at the same time,
   wherein the first transceiving path and the second transceiving path are allocated according to a distance between the wireless communications device and a peer wireless communications device, and wherein the first wireless communications transceiver or the second wireless communications transceiver further requests the peer wireless communications device to transmit the first wireless signal or the second wireless signal with a fixed transmission power.

12. The method as claimed in claim 11, wherein the first transceiving path and the second transceiving path are allocated according to operation statuses of the first wireless transceiver or the second wireless communications transceiver.

13. The method as claimed in claim 11, wherein the first transceiving path and the second transceiving path are allocated according to signal indicators of the first wireless signal or the second wireless signal.

14. The method as claimed in claim 13, wherein the allocating step comprises allocating the first transceiving path having a smaller path loss than the second transceiving path to the first wireless communications transceiver when the signal indicator of the first wireless signal is lower than a threshold.

15. The method as claimed in claim 13, wherein the signal indicators comprise at least one of the following:
    received signal strength indication (RSSI) of the first wireless signal or the second wireless signal;
    signal to noise ratio (SNR) of the first wireless signal or the second wireless signal;
    interference to signal ratio (ISR) of the first wireless signal or the second wireless signal;
    adjacent channel interference (ACI) of the first wireless signal or the second wireless signal;
    packet error rate (PER) of the first wireless signal or the second wireless signal; and
    bit error rate (BER) of the first wireless signal or the second wireless signal.

16. The method as claimed in claim 13, wherein the allocating step comprises allocating the first transceiving path having a smaller path loss than the second transceiving path to the first wireless communications transceiver when the signal indicator of the second wireless signal is greater than a threshold.

17. The method as claimed in claim 13, wherein the allocating step comprises allocating the first transceiving path having a smaller path loss than the second transceiving path to the first wireless communications transceiver, when the signal indicator of the first wireless signal is greater than a first threshold and the signal indicator of the second wireless signal is greater than a second threshold, or when the signal indicator of the first wireless signal is lower than the first threshold.

18. The method as claimed in claim 13, wherein the allocating step comprises allocating the first transceiving path having a greater path loss than the second transceiving path to the first wireless communications transceiver when the signal indicator of the first wireless signal is greater than a first threshold and the signal indicator of the second wireless signal is lower than or equal to a second threshold.

19. The method as claimed in claim 13, wherein the distance is determined according to a signal indicator of the first wireless signal or the second wireless signal.

20. A wireless communications system, comprising:
    a first wireless communications transceiver configured to transmit or receive a first wireless signal in a Transmitting (Tx) operation or a Receiving (Rx) operation, respectively;
    a second wireless communications transceiver configured to transmit or receive a second wireless signal in the Tx operation or the Rx operation, respectively; and
    an RF module comprising a connection device which comprises at least one antenna-side port and at least two transceiver-side ports, wherein a first transceiving path is formed by a coupling of the antenna-side port and one of the transceiver-side ports and a second transceiving path is formed by a coupling of the antenna-side port and another one of the transceiver-side ports; and
    wherein the RF module is configured to allocate the first transceiving path and the second transceiving path to the first wireless communications transceiver and the second wireless communications transceiver, respectively, to enable:
    the transmissions of the first wireless signal and the second wireless signal at the same time when both of the first wireless communications transceiver and the second wireless communications transceiver are in the Tx operation,
    the receptions of the first wireless signal and the second wireless signal at the same time when both of the first wireless communications transceiver and the second wireless communications transceiver are in the Rx operation, and
    the transmission of one of the first wireless signal and the second wireless signal and the reception of the other one of the first wireless signal and the second wireless signal at the same time when the first wireless communications transceiver and the second wireless communications transceiver are in the Tx operation and the Rx operation, respectively, or in the Rx operation and Tx operation, respectively,
    wherein the first transceiving path and the second transceiving path are allocated according to a distance between the wireless communications system and a peer wireless communications device, and
    wherein the first wireless communications transceiver or the second wireless communications transceiver further requests the peer wireless communications device to transmit the first wireless signal or the second wireless signal with a fixed transmission power.

21. A method for coexistence of a plurality of wireless communications transceivers in a wireless communications device, comprising:
    providing a connection device comprising a connection device which comprises at least one antenna-side port and at least two transceiver-side ports, wherein a first transceiving path is formed by a coupling of the antenna-side port and one of the transceiver-side ports and a second transceiving path is formed by a fixed coupling of the antenna-side port and another one of the transceiver-side ports;
    determining whether a first wireless communications transceiver is transmitting or receiving a first wireless signal in a Transmitting (Tx) operation or a Receiving (Rx) operation, respectively, and a second wireless communications transceiver is transmitting or receiving a second wireless signal in the Tx operation or the Rx operation, respectively; and
    allocating the first transceiving path and the second transceiving path to the first wireless communications transceiver and the second wireless communications transceiver, respectively, to enable:
    the transmission of the first wireless signal and the second wireless signal at the same time when both of the first wireless communications transceiver and the second wireless communications transceiver are in the Tx operation, the receptions of the first wireless signal and the second wireless signal at the same time when both of the first wireless communications transceiver and the second wireless communications transceiver are in the Rx operation, and the transmission of one of the first wireless signal and the second wireless signal and the reception of the other one of the first wireless signal and the second wireless signal at the same time when the first wireless communications transceiver and the second wireless communications transceiver are in the Tx operation and the Rx operation, respectively, or in the Rx operation and Tx operation, respectively, wherein the first transceiving path and the second transceiving path are allocated according to a distance between the wireless communications device and a peer wireless communications device, and wherein the first wireless communications transceiver or the second wireless communications transceiver further requests the peer wireless communications device to transmit the first wireless signal or the second wireless signal with a fixed transmission power.

\* \* \* \* \*